United States Patent
Hoard et al.

(10) Patent No.: US 6,631,481 B1
(45) Date of Patent: Oct. 7, 2003

(54) METHOD AND APPARATUS FOR INJECTING AN ERROR INTO A WAVEFORM SENT OVER A DATA LINK

(75) Inventors: Michael A. Hoard, Lake Ocwego, OR (US); Harold B. Hutchison, Jr., Forest Grove, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/505,054

(22) Filed: Feb. 16, 2000

(51) Int. Cl.$^7$ ................................................ G06F 11/00
(52) U.S. Cl. ............................ 714/41; 702/66; 702/124
(58) Field of Search .......................... 714/41, 703, 736; 702/66, 71, 124; 375/224

(56) References Cited

U.S. PATENT DOCUMENTS

| | | | |
|---|---|---|---|
| 4,999,837 A | * | 3/1991 | Reynolds et al. ............ 714/703 |
| 5,621,354 A | * | 4/1997 | Mitzlaff ........................ 330/52 |
| 6,067,647 A | * | 5/2000 | Cummins .................... 714/703 |
| 6,268,808 B1 | * | 7/2001 | Iryami et al. ................. 341/51 |
| 6,381,269 B1 | * | 4/2002 | Gradl et al. ................. 375/224 |

OTHER PUBLICATIONS

"Real–Time Network Fault Injector for Verifying Error Recovery of Fibre Channel Systems," *Gigabit Traffic Jammer*, Finisar Corporation (published prior to filing date of application).

"Real–Time System Level Error Injection Module," *Jammer Module*, Finisar Corporation (published prior to filing date of application).

"Simultaneous Multiport Protocol Analysis," *App Note GT–A98A Multianalyzer Feature*, Finisar Corporation (published prior to filing date of application).

"Trace View FC–2 and SCSI Decode," *App Note GT–TV98A Protocol View*, Finisar Corporation (published prior to filing date of application).

"FCT–5500 Fibre Channel Generator," Ancot Corporation (published prior to filing date of application).

"FCT–5500 Fibre Channel Generator," http://www.ancot.com/fcproducts/5500/5500html, (Jun. 2, 1999).

"FCAccess 1000 Fibre Channel Analyzer," Ancot Corporation (published prior to filing date of application).

(List continued on next page.)

*Primary Examiner*—Robert Beausoliel
*Assistant Examiner*—Christopher S. McCarthy
(74) *Attorney, Agent, or Firm*—Klarquist Sparkman Campbell Leigh & Whinston; Heslin Rothenberg Farley & Mesiti

(57) ABSTRACT

A method for injecting an error into a waveform sent over a data link includes the following: The data link is monitored for a control event such as a symbol in the waveform. In response to the control event, a control signal is generated. In response to the control signal, the waveform is distorted, thereby injecting an error into it. The method can be applied in a number of ways. For example, different control events can be chosen, including fill words, start-of-frame or end-of-frame delimiters, or other recognizable portions of a waveform whether before or after the data field. The distortion applied to the waveform can take the form of amplitude or frequency distortion, or both. The method is applicable to electrical, optical, or other types of signals. Selected parts of a waveform can be distorted by introducing delay into the method, such as delay in generating the control signal, delay in generating the distortion, or delay in transmitting the waveform. The distorted waveform may also be viewed and captured for later analysis and comparison with an undistorted waveform. The methods of the invention can be implemented in an number of ways, such as in an error injector that is coupled into a data link within the system under test.

27 Claims, 9 Drawing Sheets

OTHER PUBLICATIONS

"FCAccess 1000 Fibre Channel Analyzer," http://www.ancot.com/fcproducts/1000/1000.html, (Jun. 2, 1999).

"GTX–B Bit Error Rate Tester; The Extended Physical Layer Verification System," Finisar Corporation (product described in publication in public use prior to filing date of application).

"Silkworm 2400 and 2800; Fibre Channel fabric switches," BROCADE (published prior to filing date of application).

* cited by examiner 79.6ns — 10ns/div — 179.6ns

| Vertical Desc | Horizontal Desc | Acquire Desc | Graticules | Main Size | Pan/Zoom |
|---|---|---|---|---|---|
| Avg (M5) Fast | Main @ 512 pts | Stopped | Single s,V | 10ns/div | Off |
| Sampling Head Fnc's | Window Mode | Save Trace Desc | More . . . | Main Pos 78.4ns | |
| | | | | Remove/Clr Trace 1 | |
| | | Trace Status | | Avg (M5) Main | |

FIG. 4C-2

METHOD AND APPARATUS FOR INJECTING AN ERROR INTO A WAVEFORM SENT OVER A DATA LINK

TECHNICAL FIELD

This invention relates generally to error detection and recovery in data processing systems. More particularly, this invention relates to the controlled insertion of low level errors into a data processing system through distortion of signal waveforms sent over a data link in the system. With this technique, the ability of system devices to detect and recover from such low level errors can be determined.

BACKGROUND

Necessary to any data processing system—whether a multiprocessor system, a uniprocessor system, a local area network, etc.—are the means for interconnecting the system devices. Physically, these means include data links, such as fiber optic or coaxial cable, electrical wire or other media, and interface control units at each end of the data link. The interface control unit provides a logical handshake to a system device to allow the system devices to communicate with each other over the data link. The logical handshake provides initialization, transfer of data, administrative tasks, error recovery, and re-initialization. Communication between system devices follows a protocol such as defined in a number of standards including Fibre Channel, Gigabit Ethernet, FDDI (Fiber Distributed Data Interface), and SONET (Synchronous Optical Network). Interface control units vary in name and design and may include parallel-to-serial transducers, such as GLMs (gigabit linking modules) or serial-serial transducers, such as GBICs (gigabit interface converters), which are installed on adapter cards in system devices or directly on system motherboards. An interface control unit typically includes physical media, an encoding layer, and a network protocol generator.

Critical to any data processing system is its ability to detect and recover from errors that occur within it. Test systems presently exist for determining whether a particular system device can detect certain types of errors. Finisar Corporation of Mountain View, Calif., and Ancot Corporation of Menlo Park, Calif., for example, offer several test systems for injecting higher-level errors into Fibre Channel networks in real time. Injected errors are created by making changes to bits, bytes, words, or frames, and they mimic the errors caused by digital logic or a bus within a system device. Such test systems test the ability of a system device to recover from errors of the type that may be generated in its logic or data path circuitry.

These test systems, however, cannot create and inject errors at the lower, physical level, that is, errors caused by distortion in waveforms that carry data over a data link. This type of error may or may not produce an invalid digital value. Such distortion is typically caused by ground plane noise from power system reset events, degraded lasers with spurious transient faults, breaks in cable or wiring, and other events that degrade, interfere or otherwise impact the waveform. For example, a poor quality laser diode may exhibit characteristics of self pulsation, which results in undecipherable characters being presented at the transceiver. The detection and tolerance to such physical perturbations depends upon the system device design, including the design of the receive circuitry, the phase lock loop, clock recovery circuit, the PCB dielectric material integrity, and the ASIC layout. But because present test systems cannot create actual errors of this type, they cannot test the ability of a system device to detect and recover from them.

A simple way to inject such errors is to insert into the system a faulty interface control unit that distorts signal waveforms being transmitted or received on a data link. But faulty interface control units (or other devices, in general) do not inject errors consistently and repeatedly, making it difficult to construct an environment for testing the response of a system device to errors created by distorted waveforms.

An objective of the invention, therefore, is to provide a method and means for reliably creating a distorted signal waveform of desired characteristics (such as by distorting the waveform's amplitude and frequency) and for inserting the distorted waveform into a data processing system. With such a method, a test system can determine the ability of system devices to detect and correct for errors in such a waveform.

SUMMARY

In accordance with the invention, a method for injecting an error into a waveform sent over a data link comprises the following: The data link is monitored for a control event in the waveform. In response to the control event, a control signal is generated. In response to the control signal, the waveform is distorted, thereby injecting an error into it.

The method can be applied in a number of ways. For example, different control events can be chosen, including fill words, start-of-frame or end-of-frame delimiters, or other recognizable portions of a waveform whether before or after the data field. The distortion applied to the waveform can take the form of amplitude or frequency distortion, or both. The method is applicable to electrical, optical, or other types of signals. Selected parts of a waveform can be distorted by introducing delay into the method, such as delay in generating the control signal, delay in generating the distortion, or delay in transmitting the waveform. The distorted waveform may also be viewed and captured for later analysis and comparison with an undistorted waveform.

The methods of the invention can be implemented in an number of ways, such as in an error injector that is coupled into a data link within the system under test.

These and other aspects of the invention are more fully described below with reference to an illustrative embodiment.

DETAILED DESCRIPTION

The illustrated embodiments of the invention hereafter described are designed for use within a multiprocessor system such as the one shown and described herein. It should be readily recognized from this disclosure, however, that the invention is not limited to such use but can be modified as necessary for use in any system where data links transmit signal waveforms between interfaces, such as a network.

Figure 1:
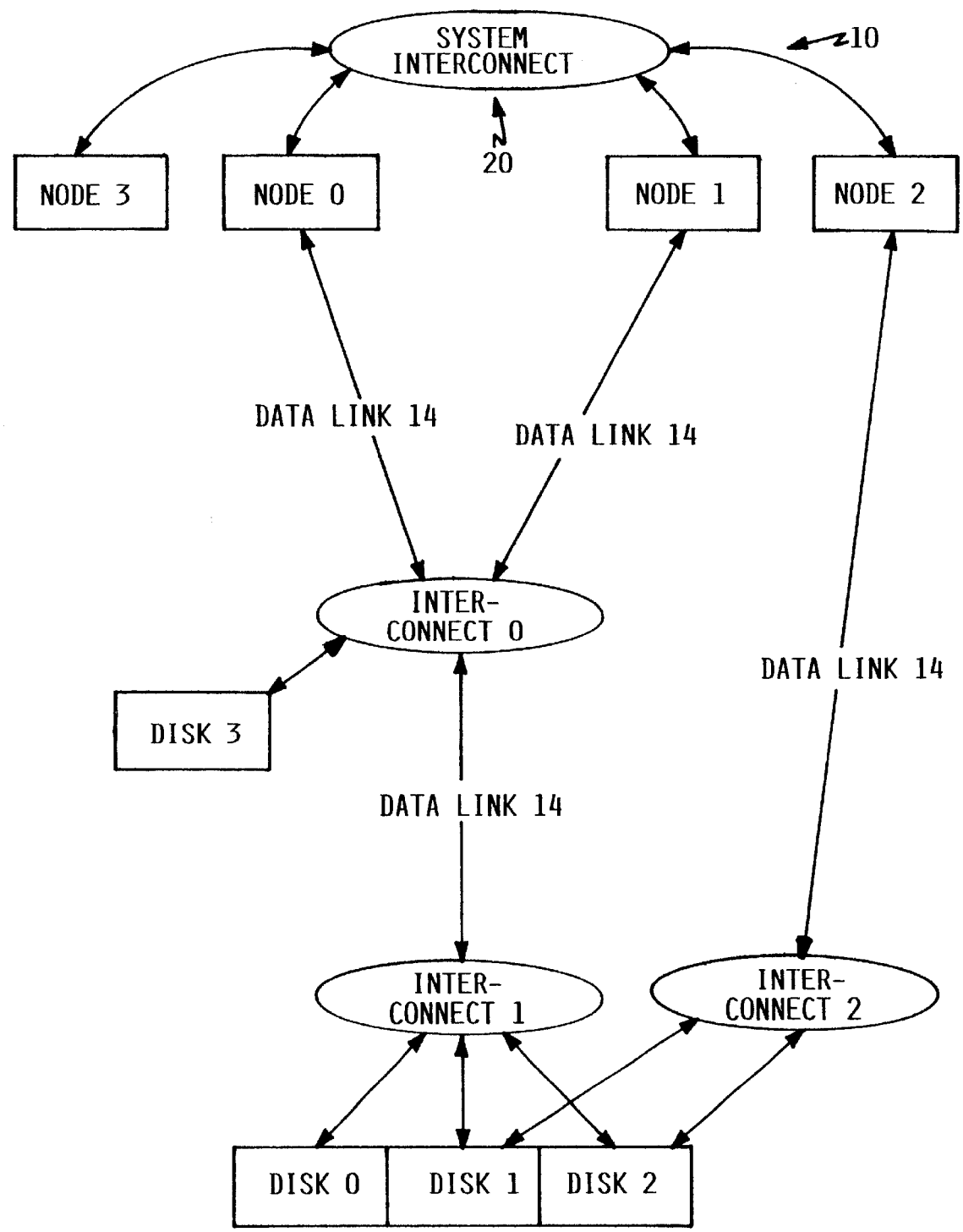
FIG. 1 is a block diagram of a multiprocessor system in which the invention may be used to insert errors into data links.

FIG. 1 is a block diagram of a multiprocessor computer system 10 that uses a computer architecture based on distributed shared memory (DSM). This type of computer system is also known as a NUMA machine. In the system 10 four processor nodes 0, 1, 2, and 3 are shown connected by a system interconnect 20 that permits any node to communicate with any other node. The purpose of system interconnect 20 is to allow processors in any node to directly and transparently access the physical memory that resides in any other node. The devices of system 10 include the nodes 0–3, interconnects 0–2 (which may be an arbitrated loop, a switch, a router, a hub, a bus, etc.), and I/O devices such as disks 0–3, interconnected by data links 14 (such as optical fiber, wire, or other media) indicated by arrows interconnecting the system devices.

Figure 2:
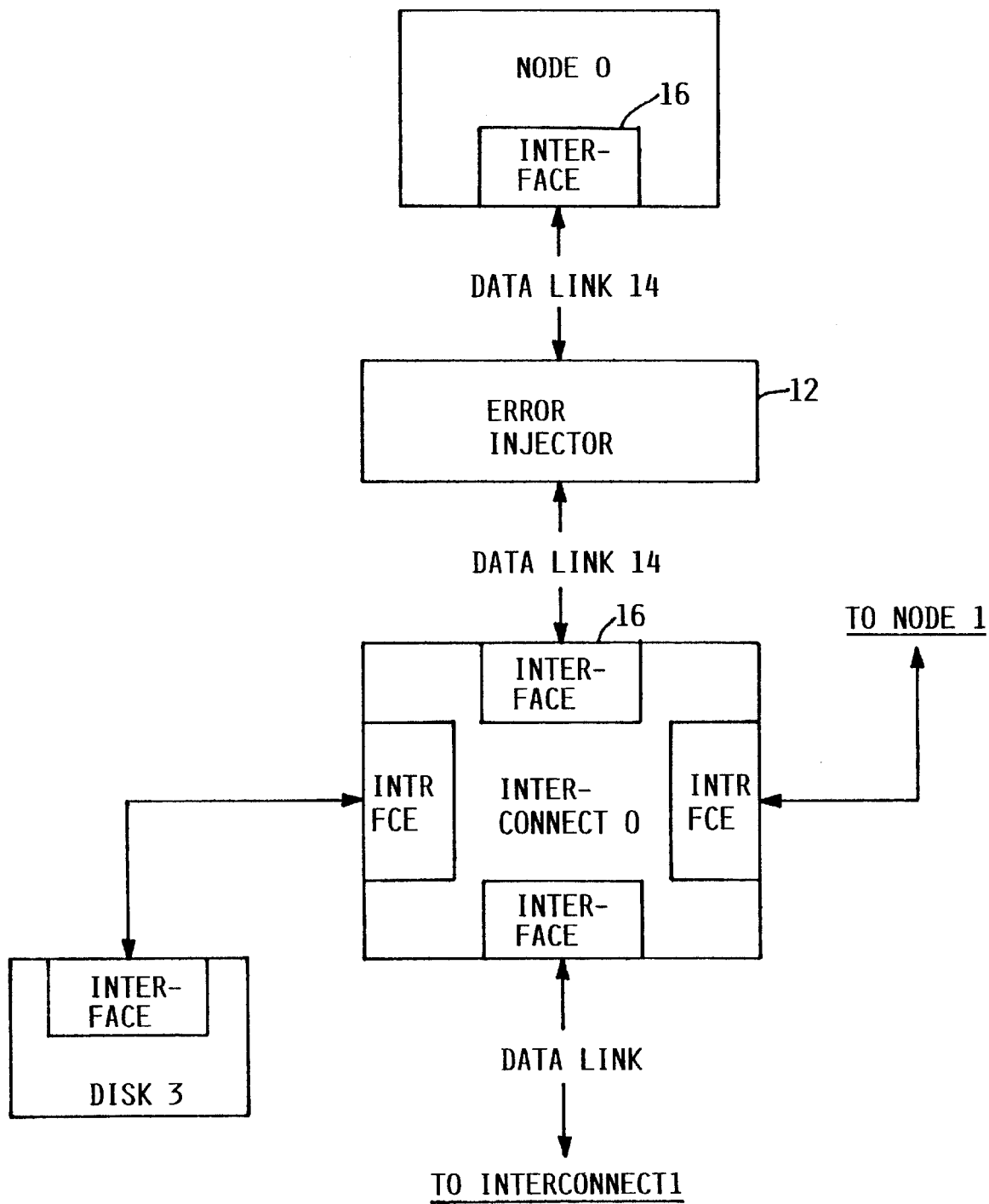
FIG. 2 is a block diagram of a portion of the multiprocessor system showing the insertion of an error injector in accordance with the invention in use.

Referring to FIG. 2, associated with the system devices for interconnecting them are interface control units 16. These control units convert data from one format to another for transmission through the data links that connect the devices. The interface control unit associated with node 0, for example, translates outgoing data into the Fibre Channel format before transmitting the data through a data link 14 to interconnect 0. From interconnect 0, these packets are forwarded through data links to disk 3 and to interconnect 1, where the data may be translated to a different format such as SCSI, depending upon the nature of disks 0–2. Interconnect 0 has four interface control units because it receives and transmits data through four data links. Also shown in block form is an error injector 12 inserted into data link 14 between node 0 and interconnect 0 for injecting errors into waveforms in the data link in a manner to be described.

Figure 3:
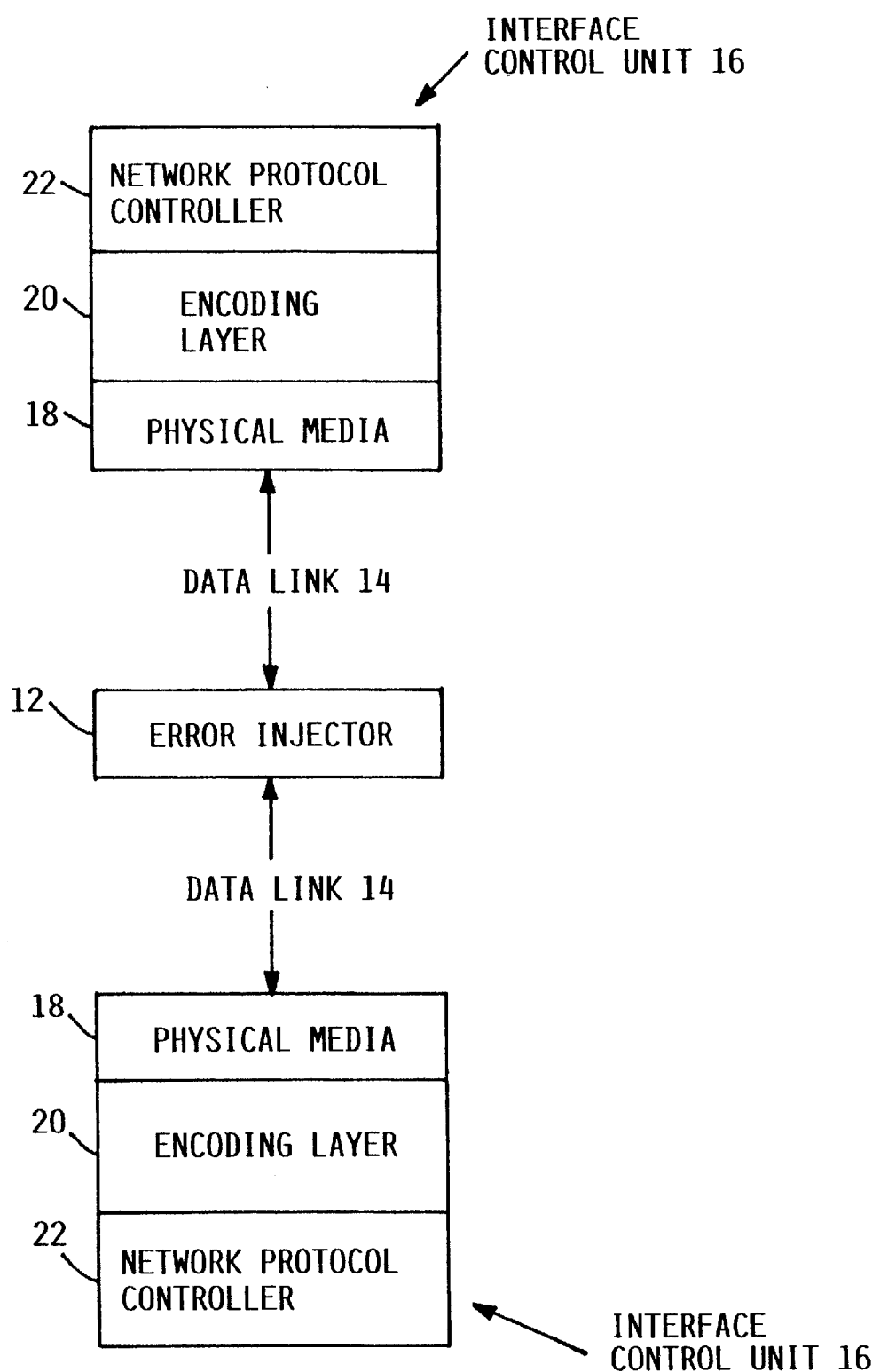
FIG. 3 is a more detailed block diagram showing the coupling of the error injector into a data link between the interface control units of two system devices.

FIG. 3 is a simplified block diagram showing the error injector 12 inserted within a data link 14 between the interface control units 16 of node 0 and interconnect 0. Data is transmitted over the data link, using a number of network layers within the interface control unit. Each interface control unit, of conventional design, includes a physical media layer 18, an encoding layer 20, and a network protocol controller layer 22. The network protocol controller provides a number of data movement and control facilities. These facilities allow data to be transferred to and from system memory as well as ensure routing and flow control over the data link, data integrity of packets transferred, and logical level error recovery operations. The format of data within the network protocol controller is generically parallel words in memory. Data is typically moved through the network protocol controller 22 by internal memory transfers or direct memory access (DMA) transfers. The network protocol controller encapsulates the transfer of system data within data packets. These data packets are then provided to the encoding layer 20 while still in the parallel word format. The encoding layer provides a mapping from the parallel word format to the serial bit stream format for transmission over the physical media layer 18. The variety of network protocols listed above each has a respective serial encoding format. The physical media layer 18 includes of a large number of integrated circuits, signal traces, connectors, as well as discrete components. Within the layer 18, the format of the serial bit stream is a waveform, which is conditioned, shaped, routed between components, and then transmitted over the media of the data link 14.

Prior test systems such as those noted above can inject errors at the higher-level network protocol controller and encoding layers, and can test system devices for their ability to detect and recover from such errors. However, such prior test systems cannot inject errors at the lower-level physical media layer and therefore cannot test system devices for their ability to detect and recover from errors caused by distorted waveforms.

The error injector 12 can inject these lower-level errors when coupled into a data link 14. These errors include amplitude and frequency distortion of the signal waveform. In a real-world environment, such errors result from ground plane noise, device aging, spurious transient faults, breaks in cable or wiring, and other events that degrade, interfere or otherwise impact the waveform. The signal waveform may be optical or electrical, depending upon the nature of the data link.

Figure 4A:
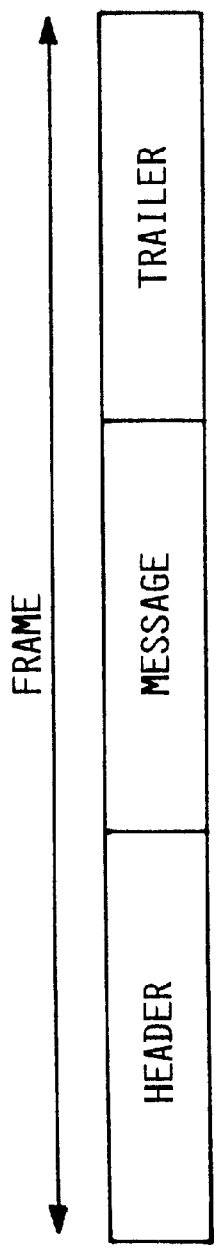
FIGS. 4A and B are logic diagrams, respectively, of an exemplary data frame and particular data frame that are transmitted through a data link.

FIG. 4A is a logical block diagram of a exemplary data frame (packet) sent over a data link 14 within the system 10. Logically, the data frame consists of a header portion, a message portion, and a trailer portion, each portion including one or more bit fields. The frame header typically includes a start-of-frame field, source address field, destination address field, frame type field, etc. The message includes a data payload and perhaps an auxiliary header associated with an upper level protocol. The trailer portion includes error checking, an end-of-frame field, and perhaps others, depending upon the protocol. Any recognizable symbol with any portion of the data frame can be used as control event for distorting a waveform.

Figure 4B:
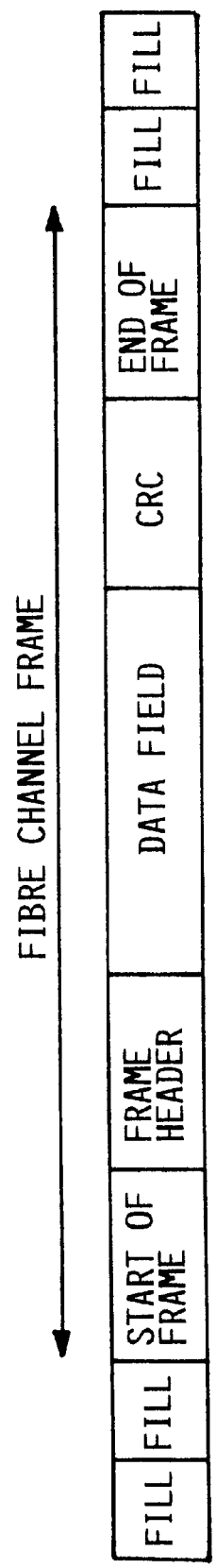
FIGS. 4C and 4D are waveform diagrams, respectively, of a signal waveform before and after the waveform has been distorted.

FIG. 4B shows the layout of a particular data frame, a Fibre Channel frame. Note that between frames, fill words (symbols placed between data frames) are placed on the data link. These words may be Idle, Receiver Ready (R_RDY), or other words, bytes, or delimiters between frames. The data within the fill, header, and trailer is predictable, and any of it can serve as a control event for detecting and distorting the waveform, as will be described. Therefore, control events may include waveform characteristics associated with features within data frames, as well as between data frames.

Figures 1, 4C:
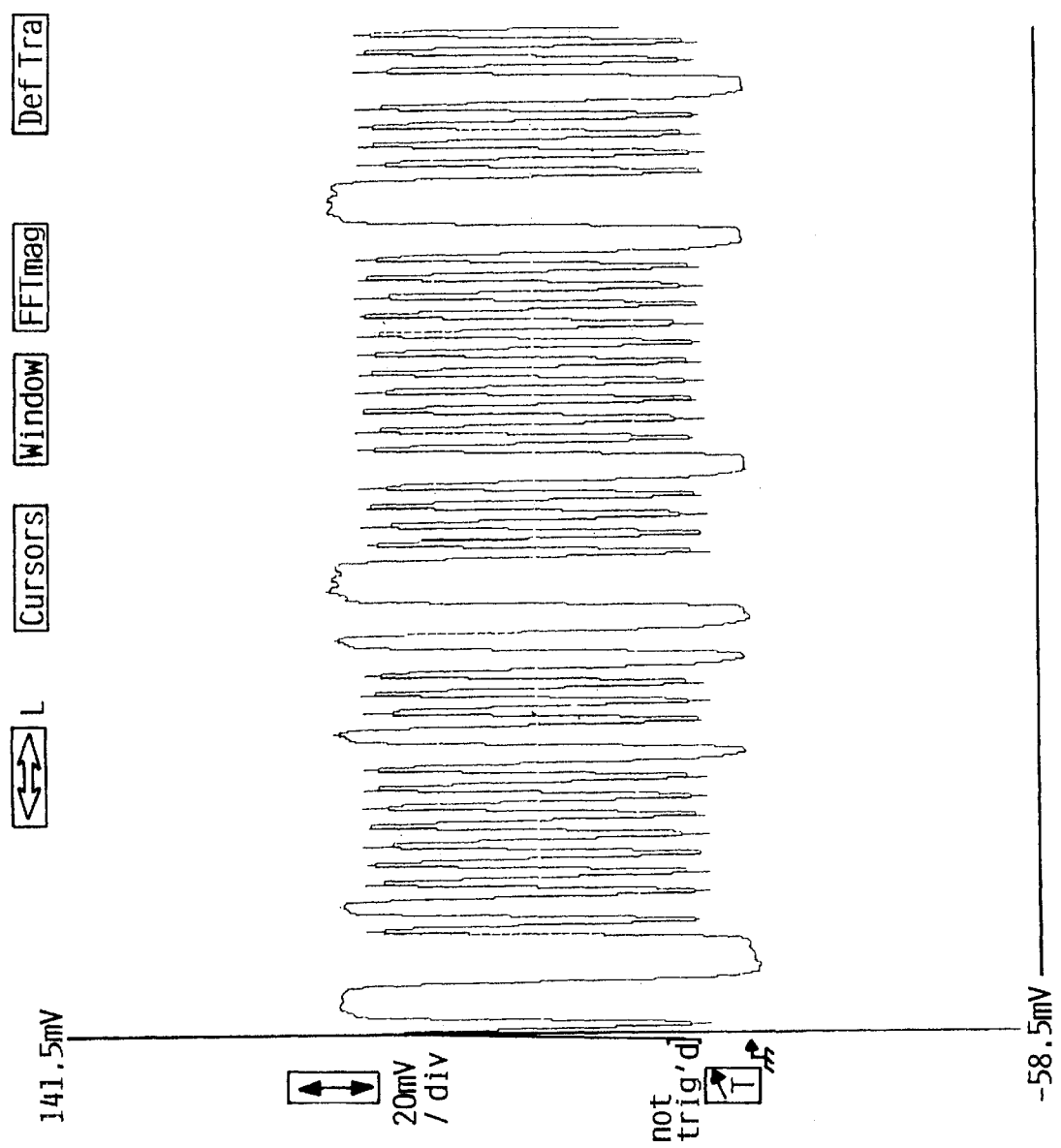

FIG. 4C show the physical nature of a waveform as it travels along the data link before the waveform has been distorted, either naturally or through the use of the error injector 12. At the physical level, the waveform is a series of quasi square waves signifying the binary digits 0 and 1. The periodic nature of the waveform shown, with its normal amplitude and frequency, is representative of what occurs when the NOS fill word is transmitted.

Figure 4D:
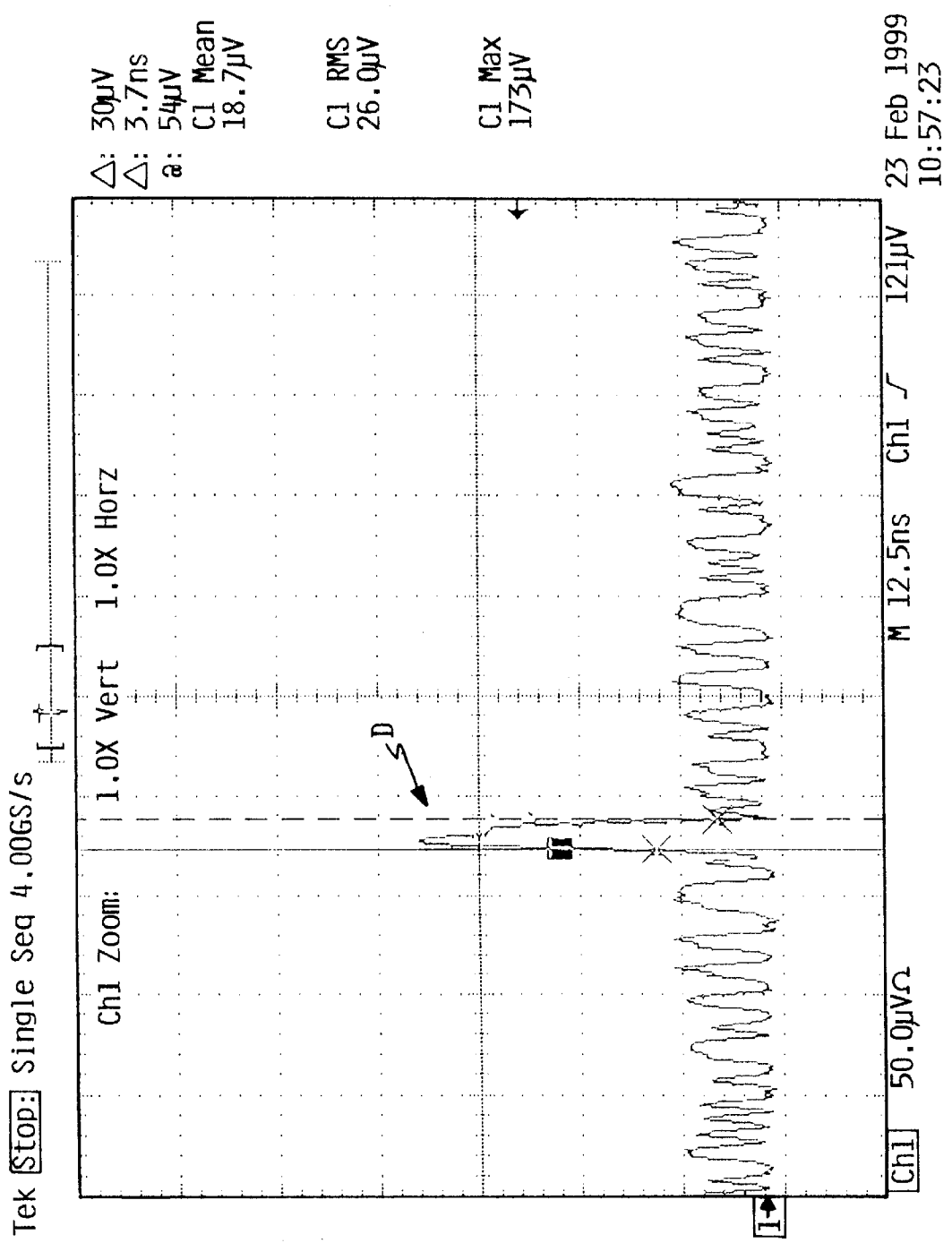

FIG. 4D, on the other hand, shows significant distortion at point D in the amplitude of the waveform. This type of distortion can result from the causes noted above. It can also be introduced in a controlled environment through the method and means of error injector 12.

Figure 5:
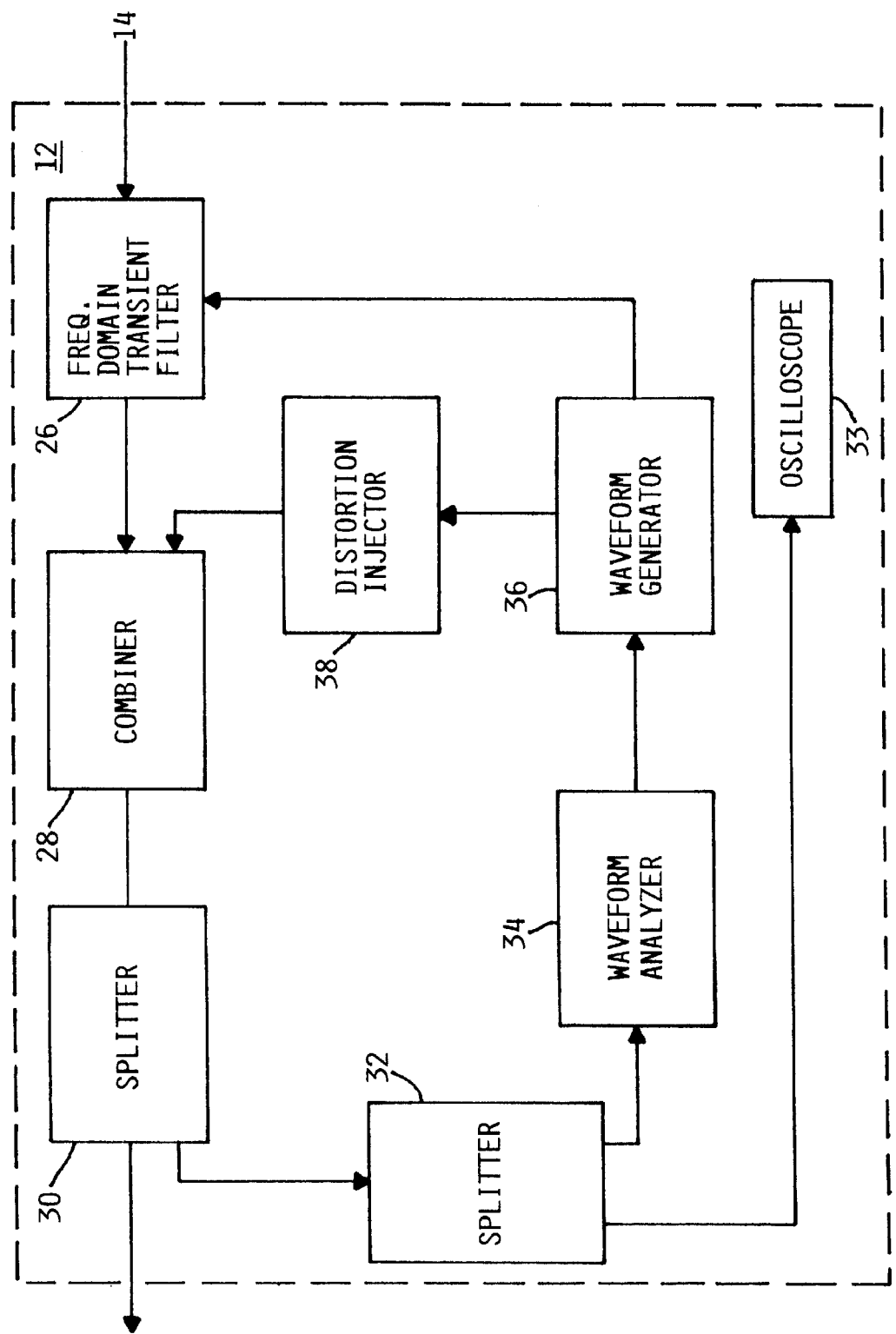
FIG. 5 is a block diagram of a first embodiment of an error injector made in accordance with the invention.

FIG. 5 is a block diagram of a first embodiment of the error injector 12 made in accordance with the invention, which may be configured for handling optical or electrical signal waveforms. A frequency domain transient filter 26 first receives the signal waveform from a data link 14. The filter 26 can be an active equalization circuit that, when activated by a control signal, modulates the frequency of the signal waveform. For an optical waveform, the filter includes a photo-detector for converting the optical signal to an electrical signal before the signal's application to the equalization circuit and a laser diode coupled to the output of the equalization circuit to reconvert the modulated electrical signal back to an optical signal. The filter 26 is coupled to a combiner 28. Optical combiners are well known. For an electrical signal waveform, an OR gate or equivalent circuit can be used as a combiner to combine the signal waveform with distortion. The combiner 28, like the filter 26, is active only in response to a control signal; otherwise, the signal waveform passes through it without distortion. Coupled to the combiner is a splitter 30 that splits the signal, sending one copy of the waveform onward through the data link 14 and another copy to a second splitter 32. Optical splitters are well known. For an electrical signal waveform, a multiplexer or equivalent circuit can be used. Coupled to the splitter 32 are a waveform analyzer 34 and an optional oscilloscope 33. The waveform analyzer can take many forms such as a protocol analyzer or network analyzer and triggers in response to a selectable control event, such as a recognizable symbol or character in the waveform. The waveform analyzer 34 is coupled to a waveform generator 36. Physically, the waveform generator may be part of the waveform analyzer or a separate component, such as a pulse generator. The waveform generator 36, in turn, is coupled to a distortion injector 38 and to the filter 26. The distortion injector 38 can be a laser diode (if the waveform is optical) that generates an optical pulse or a wire (if the waveform is electrical) that transmits the output of the waveform generator directly to the combiner 28.

In operation, the filter 26 initially receives a signal waveform such as shown in FIG. 4C traveling on a data link 14. Until a control event is detected in the waveform, the filter is inactive and the waveform passes through it undistorted. The waveform continues through combiner 28, which is also inactive until a control event in the waveform is detected. At splitter 30, one copy of the waveform is sent to splitter 32 and from there to oscilloscope 33 and waveform analyzer 34. The analyzer triggers in response to detection of a control event in the waveform. When a control event is detected, the analyzer generates a control signal that is applied to the waveform generator 36. The waveform generator responds by generating a pulse or other output that is applied to the distortion injector 38 or filter 26 or both, depending upon the type of distortion desired. If amplitude distortion is desired, the distortion injector 38 receives the pulse and generates distortion that is combined with the signal waveform at the combiner 28 to distort its amplitude. The pulse may be chosen so that it distorts the amplitude of the waveform by increasing or attenuating it. If frequency distortion is desired, the output of the waveform generator is applied to the filter 26, which responds by distorting the frequency of the signal waveform.

The distorted waveform that emerges from the combiner 28 is also split by splitters 30 and 32, allowing it to be viewed on oscilloscope 33 and compared with the undistorted waveform previously capture.

The timing of when the signal waveform will be distorted and the length of the distortion can be varied. Delays may be introduced into one or more of the components to delay the creation of the distortion. For example, the waveform analyzer 34 may be constructed with a variable delay so that it generates a control signal in response to a control event at a selected time after detection of the event. Similarly, variable delays may be introduced into the waveform generator 36. Furthermore, the length of distortion can be varied by generating the control signal for a selected time.

Figure 6:
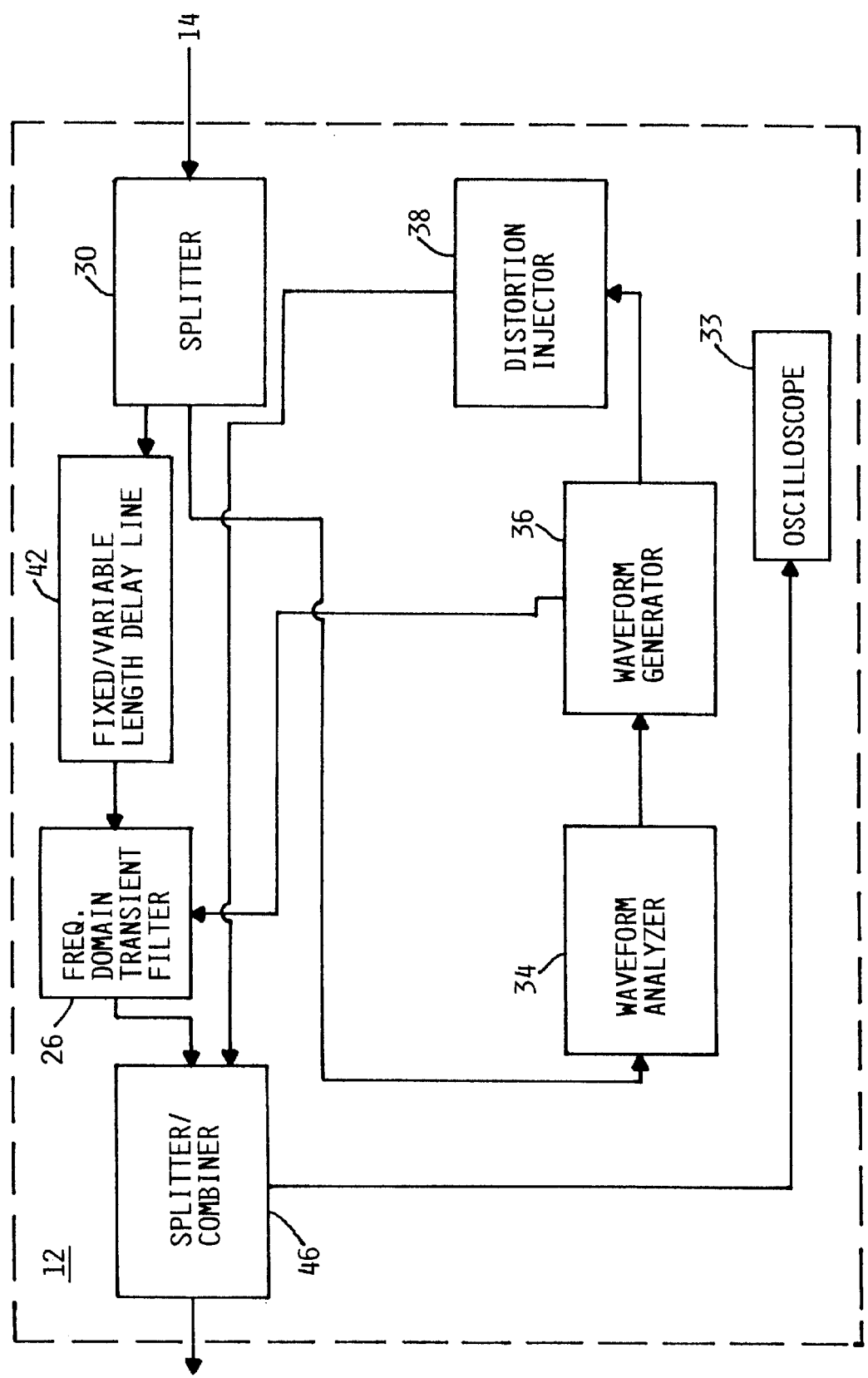
FIG. 6 is a block diagram of a second embodiment of an error injector made in accordance with the invention.

FIG. 6 is a block diagram of a second embodiment of an error injector made in accordance with the invention. This embodiment works similarly to the first embodiment, except the order in which steps occur is different. The control event can be after the portion of the waveform being distorted, such as in the EOF field. In this embodiment, the splitter 30 splits the signal waveform as it is received. One copy of the waveform is passed through a delay line 42 and the transient filter 26 to a splitter/combiner 46. The other copy of the waveform is routed to the waveform analyzer 34, which, as before, generates a control signal in response to a control event. The control signal is applied to the waveform generator 36 that, in turn, generates a pulse that is applied to the filter 26 or a distortion injector 38, or both, which respond as described above. The undistorted waveform, meanwhile, is delayed within delay line 42. At a selected time, it emerges from the delay line to be distorted by the filter 26 or splitter combiner before the waveform is passed to the data link 14. Desired portions of the signal waveform may be selected for distortion by adjusting the delay line 42.

It will be appreciated and understood by those of skill in the art that the waveform analyzer is capable of monitoring and detecting a variety of different control events within the signal waveform. A control event may consist of a single characteristic within the signal waveform, or a control event may consist of multiple criteria, which must be satisfied before generation of the control signal. The control event may occur before, contemporaneously with, or after the portion of the waveform being distorted, and may itself be distorted. Examples of possible control events in the Fibre Channel protocol include the component parts of the frame structure shown in FIG. 4B, such as the symbols for Start Of Frame (SOF), Frame Header, Cyclic Redundancy Check (CRC), and End Of Frame (EOF). The frame header includes further symbols such as Frame Type, Destination Identification (D_ID), Source Identification (S_ID), Routing Control, and Frame Control. Symbols that make up the data payload may also be used as control events, including optional header fields, upper level protocol command/ response fields, and data fields. Additionally, symbols in the fill words between the data frames can be used as control events, including Idle, Receiver Ready (R_RDY), Not Operational Sequence (NOS), Offline Sequence (OLS), Link Reset Sequence (LR), and Link Reset Response Sequence (LRR).

A control event can also consist of one or more symbols within the data frame combined with one or more symbols between data frames, such as the monitoring and detection of a specific Frame Type being routed to a specific Destination Identification (D_ID), which matches a specific Upper Level Protocol Command/Response category. Upon satisfaction of these multiple criteria, the waveform analyzer 34 generates the control signal.

The distortion added to the signal waveform can be placed very precisely in relation to the position in time of the control event within the waveform. This is accomplished with appropriate adjustment to the internal path delay within the error injector 12 and adjustment to the time delays associated to the waveform analyzer 34, waveform generator 36, and fixed/variable length delay line 42. For example, upon satisfaction of the multiple criteria defined in a control event, the distortion may be placed very precisely within a specific field within the data header or data payload. If the distortion is placed in the data frame header or payload, this test determines whether a system device is able to detect and recover from an incorrect cyclic redundancy check (CRC). If the distortion is placed onto an R_RDY symbol between data frames, this test determines whether a system device is able to detect and record the presence and number of invalid Fill Words, as well as perform link recovery operations.

The length or duration of the distorted waveform can be adjusted to be very short or very long, using adjustments available in the waveform generator 36. Short distorted waveforms test whether a system device can detect intermittent and subtle disturbances on the data link. Long distorted waveforms test whether a system device can tolerate gross level disturbances, such as loss of synchronization between the end points, and ultimately perform recovery operations. The distortion waveform may consist of a single contiguous disturbance of a given duration, or of a series of disturbances each having its respective duration. A distorted waveform comprised of a series of short disturbances can be used for testing, for example, whether a system device can detect multiple intermittent errors that occur in a single data frame or which occur across multiple data frames. A distorted waveform comprised of a series of long disturbances, on the other hand, can be used for testing whether a system device can tolerate and recover from a number of gross level disturbances.

One advantage of injecting errors into a waveform in accordance with the invention is that the distortion is injected directly in the waveform. This stresses the lowest physical media level as well as all of the other upper level components within an interface control unit 16, including the encoding level, network protocol controller, and associated software/firmware control facilities. The ability to directly stress the lowest physical media level with precision represents a new capability in the industry, and provides a comprehensive means to ensure an overall robust system design, including the lowest level physical media level design constructs. This area of system design had previously been untested, since existing methods merely replace one symbol for a different symbol at the encoding level or network protocol controller level. Previous methods provided the means to merely mimic the after effects of disturbances on the data link, and did not apply actual disturbances at the physical media level.

Having illustrated and described the principles of the invention in an exemplary embodiment, it should be apparent to those skilled in the art that the illustrative embodiment can be modified in arrangement and detail without departing from such principles. As noted above, the error injector 12 can be used to distort optical as well as electrical signal waveforms. Other forms of distortion including electronic or optical attenuation can be applied to the waveform. The components shown in the embodiments may be combined in any number of ways to carry out the described functions. Certain components can be eliminated if their functions are not required in a specific embodiment. The steps of the method for injecting errors into data can be carried out in different orders. In view of the many possible embodiments to which the principles of the invention may be applied, it should be understood that the illustrative embodiment is intended only to teach these principles and is not intended to limit the scope of the invention. We therefore claim as our invention all that comes within the scope and spirit of the following claims.

We claim:

1. A method for injecting an error into a waveform sent over a data link, comprising:

monitoring the data link for a control event in the waveform;

generating a control signal in response to the control event; and distorting the waveform in response to the control signal by modulating the frequency characterizations of the waveform, thereby injecting an error into the waveform.

2. The method of claim 1 wherein the waveform is electrical, and distorting the frequency of the waveform includes optically modulating the frequency characteristics of the waveform.

3. The method of claim 1 wherein the waveform is electrical, and distorting the frequency of the waveform includes electrically modulating the frequency characteristics of the waveform.

4. The method of claim 1 including delaying for a selected time the distorting of the waveform in response to the control signal.

5. The method of claim 1 including delaying for a selected time the generating of the control signal in response to the control event.

6. The method of claim 1 including delaying for a selected time transmission of the waveform as it is being monitored, thereby allowing the waveform to be distorted before, at, or after the control event.

7. The method of claim 1 wherein monitoring the data link for a control event in a waveform includes:

splitting a waveform in the data link into copies of the waveform, a first copy being diverted from the data link and a second copy continuing through the data link; and analyzing the first copy for a control event.

8. The method of claim 1 wherein the control event is a symbol in a start-of-frame field, destination field, source field, end-of-frame field, or frame type field.

9. The method of claim 1 including verifying injection of the error into the data link by:

capturing a copy of the waveform before it is distorted;

capturing a copy of the distorted waveform; and providing the waveform copy and distorted waveform copy for comparison.

10. A method for injecting an error into a waveform sent over a data link, comprising:

monitoring the data link for a control event in the waveform;

generating a control signal in response to the control event; and distorting the waveform in response to the control signal by combining a pulse with the waveform, thereby injecting an error into the waveform.

11. The method of claim 10 wherein the waveform is optical, and distorting the amplitude of the waveform includes combining an optical pulse with the waveform.

12. The method of claim 10 wherein the waveform is electrical, and distorting the amplitude of the waveform includes combining an electrical pulse with the waveform.

13. The method of claim 10 including delaying for a selected time the distorting of the waveform in response to the control signal.

14. The method of claim 10 including delaying for a selected time the generating of the control signal in response to the control event.

15. The method of claim 10 including delaying for a selected time transmission of the waveform as it is being monitored, thereby allowing the waveform to be distorted before, at, or after the control event.

16. The method of claim 10 wherein monitoring the data link for a control event in a waveform includes:

splitting a waveform in the data link into copies of the waveform, a first copy being diverted from the data link and a second copy continuing through the data link; and analyzing the first copy for a control event.

17. The method of claim 10 wherein the control event is a symbol of a start-of-frame field, destination field, source field, end-of-frame field, or frame type field.

18. The method of claim 10 including verifying injection of the error into the data link by:

capturing a copy of the waveform before it is distorted;

capturing a copy of the distorted waveform; and providing the waveform copy and distorted waveform copy for comparison.

19. A method for injecting an error into a waveform sent over a data link, comprising:

(i) monitoring the data link for a control event in the waveform;

(ii) generating a control signal in response to the control event; and (iii) distorting the waveform in response to the control signal, thereby injecting an error into the waveform; and said method further including testing a system device coupled to the data link by:

repeating the steps of (i)–(ii) multiple times; and recording the response of the system device to the injected errors.

20. The method of claim 19 including delaying for a selected time the distorting of the waveform in response to the control signal.

21. The method of claim 19 including delaying for a selected time the generating of the control signal in response to the control event.

22. The method of claim 19 including delaying for a selected time transmission of the waveform as it is being monitored, thereby allowing the waveform to be distorted before, at, or after the control event.

23. An apparatus for injecting an error into a waveform sent over a data link, comprising:

a waveform analyzer adapted to analyze the waveform and to generate a control signal in response to detection of a control event in the waveform;

a distortion circuit coupled to the waveform analyzer, the distortion circuit adapted to distort the waveform in response to the control signal, thereby injecting an error into the waveform; and wherein the distortion circuit includes a frequency domain transient filter adapted to distort the frequency of the waveform.

24. The apparatus of claim 23 including an oscilloscope adapted to display a copy of the waveform and a copy of the distorted waveform.

25. The apparatus of claim 23 including a delay line adapted to add a selected delay to the waveform.

26. An apparatus for injecting an error into a waveform sent over a data link, comprising:

a waveform analyzer adapted to analyze the waveform and to generate a control signal in response to detection of a control event in the waveform;

a distortion circuit coupled to the waveform analyzer, the distortion circuit adapted to distort the waveform in response to the control signal, thereby injecting an error into the waveform; and wherein the distortion circuit includes a distortion injector adapted to distort the amplitude of the waveform.

27. The apparatus of claim 26 including a delay line adapted to add a selected delay to the waveform.

* * * * *